US011150427B2

(12) United States Patent
Paddick

(10) Patent No.: US 11,150,427 B2
(45) Date of Patent: Oct. 19, 2021

(54) ELECTRICAL POWER AND OPTICAL DISTRIBUTION BOX FOR FIBER TO THE ANTENNA SYSTEMS

(71) Applicant: Prysmian S.p.A., Milan (IT)

(72) Inventor: Nathan Paddick, Milan (IT)

(73) Assignee: PRYSMIAN S.P.A., Milan (IT)

(*) Notice: Subject to any disclaimer, the term of this patent is extended or adjusted under 35 U.S.C. 154(b) by 0 days.

(21) Appl. No.: 16/766,257

(22) PCT Filed: Nov. 24, 2017

(86) PCT No.: PCT/IB2017/057382
§ 371 (c)(1),
(2) Date: May 21, 2020

(87) PCT Pub. No.: WO2019/102254
PCT Pub. Date: May 31, 2019

(65) Prior Publication Data
US 2021/0199906 A1    Jul. 1, 2021

(51) Int. Cl.
*G02B 6/44* (2006.01)
(52) U.S. Cl.
CPC ......... *G02B 6/4448* (2013.01); *G02B 6/4441* (2013.01); *G02B 6/4444* (2013.01); *G02B 6/4446* (2013.01); *G02B 6/4447* (2013.01); *G02B 6/4453* (2013.01)
(58) Field of Classification Search
CPC .. G02B 6/4441; G02B 6/4444; G02B 6/4446; G02B 6/4447; G02B 6/4448; G02B 6/4453
See application file for complete search history.

(56) References Cited

U.S. PATENT DOCUMENTS

| | | | | |
|---|---|---|---|---|
| 9,069,151 B2* | 6/2015 | Conner | ............... | G02B 6/4471 |
| 9,106,981 B2* | 8/2015 | Vastmans | ............. | G02B 6/4477 |
| 9,742,176 B2* | 8/2017 | Wang | ................... | G02B 6/4471 |
| 10,164,389 B2* | 12/2018 | Wang | ...................... | G02B 6/46 |
| 10,393,976 B2* | 8/2019 | Islam | .................. | G02B 6/4471 |
| 2015/0219856 A1* | 8/2015 | Wang | ................... | G02B 6/4416 |
| | | | | 385/53 |
| 2015/0309271 A1 | 10/2015 | Huegerich et al. | | |
| 2015/0378122 A1* | 12/2015 | Simmons | ............. | G02B 6/4453 |
| | | | | 439/529 |
| 2017/0141563 A1 | 5/2017 | Islam et al. | | |
| 2020/0081212 A1* | 3/2020 | Zhou | ...................... | H01R 13/52 |

FOREIGN PATENT DOCUMENTS

WO    2015119983 A1    8/2015

OTHER PUBLICATIONS

Bae et al, Clipped Korean Patent abstract for KR2015006712A, Jan. 2015, pp. 1-3 (Year: 2015).*

* cited by examiner

*Primary Examiner* — Ryan A Lepisto
(74) *Attorney, Agent, or Firm* — Slater Matsil, LLP

(57) ABSTRACT

Distribution box for Fiber To The Antenna (FTTA) systems comprising: an upper compartment and a lower compartment separated one from another, the lower compartment being provided with a sealable entry point for a pre-terminated hybrid cable comprising at least one electric conductor and at least one optical fiber, a plurality of electrical connectors for electrical power conductors and at least one optical connector for optical fiber being arranged within the lower compartment, the upper compartment comprising one or more connection points for hybrid jumper cables.

20 Claims, 9 Drawing Sheets

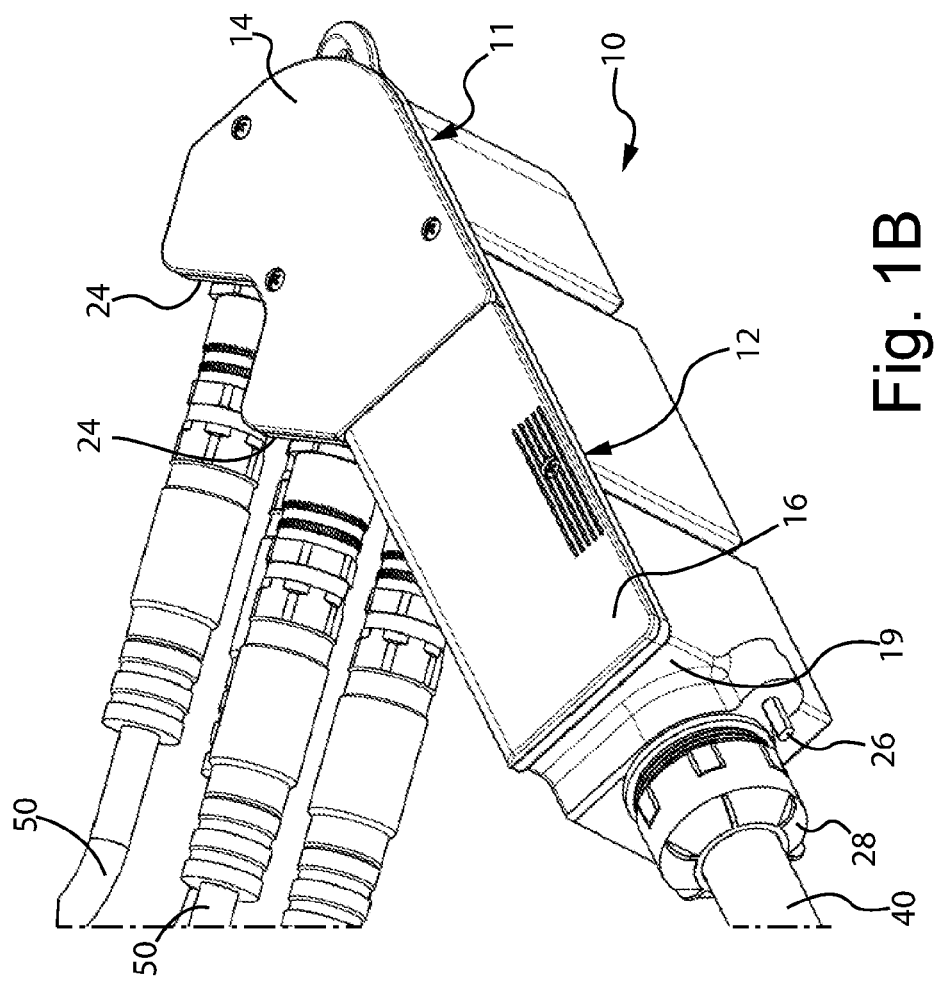
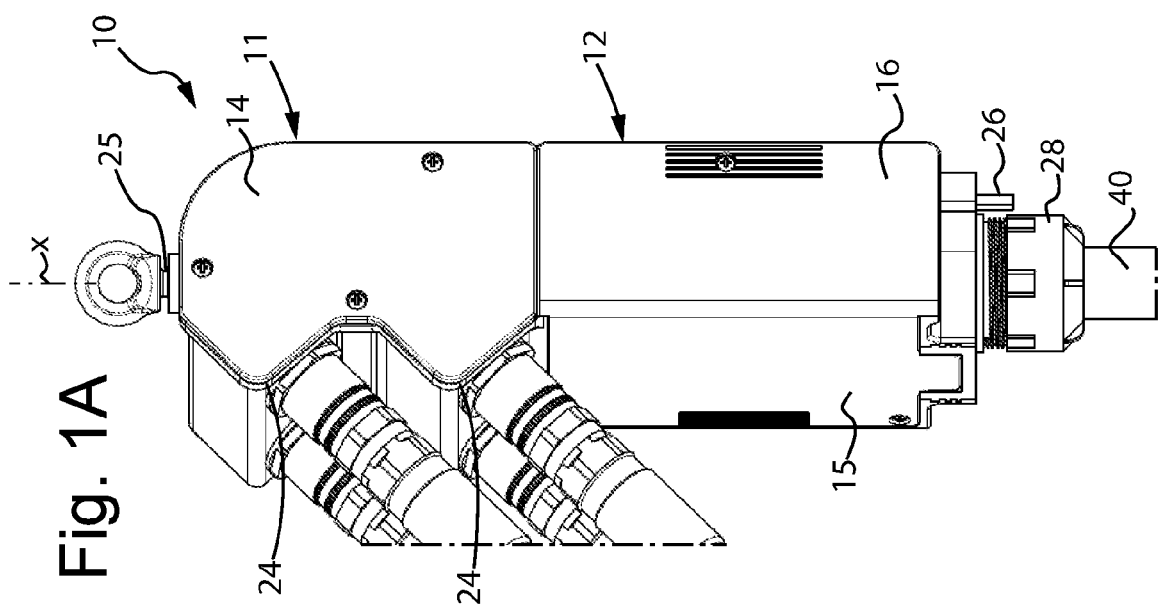

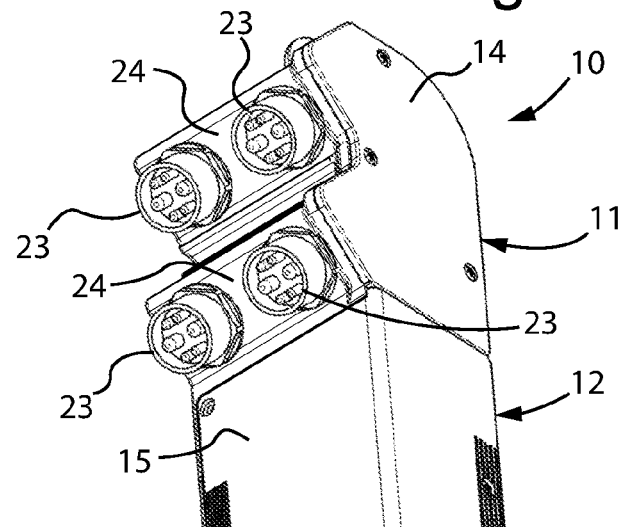
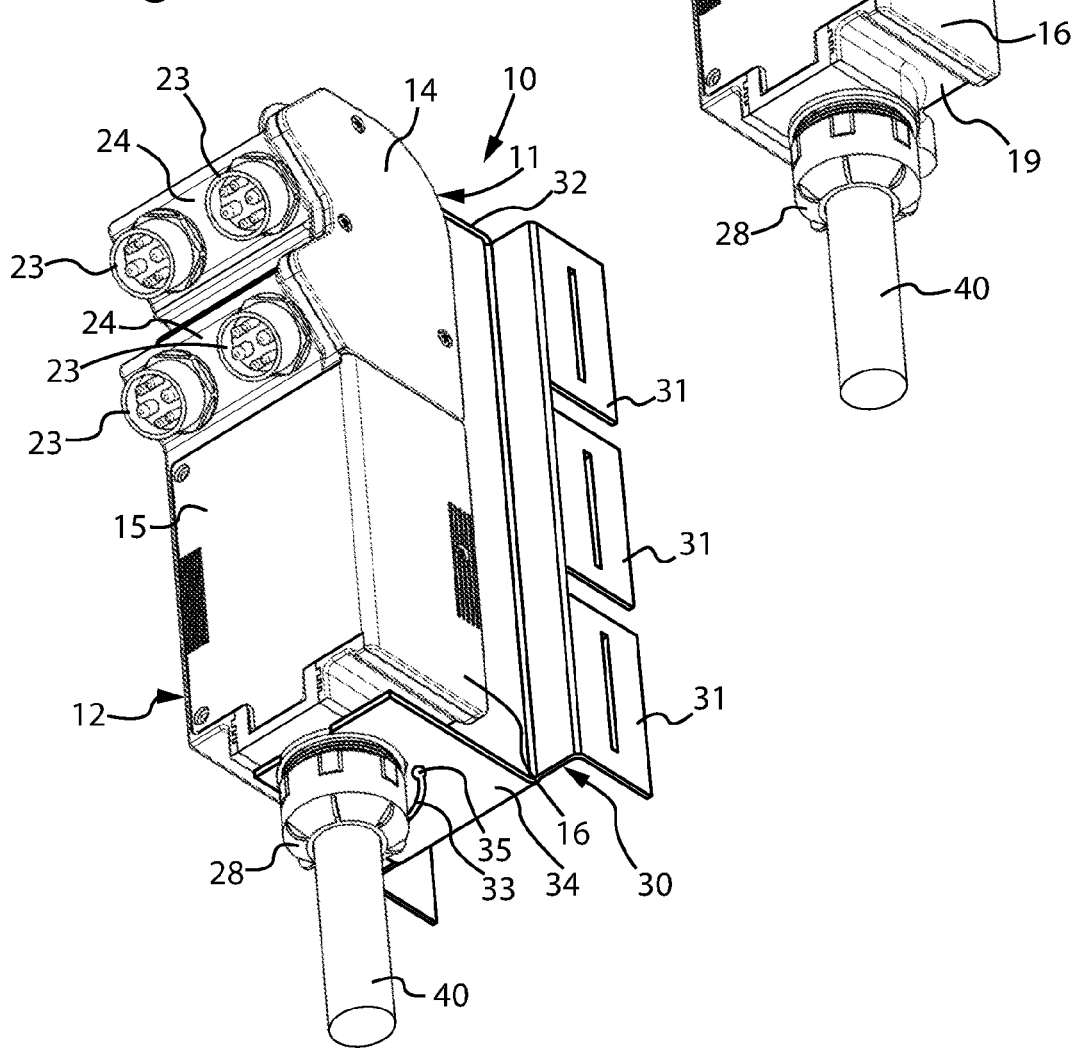

ELECTRICAL POWER AND OPTICAL DISTRIBUTION BOX FOR FIBER TO THE ANTENNA SYSTEMS

CROSS-REFERENCE TO RELATED APPLICATIONS

This application is a national stage of International Application No. PCT/IB2017/057382, filed on Nov. 24, 2017, which application is hereby incorporated herein by reference in its entirety.

TECHNICAL FIELD

The present invention relates to an electrical power and optical distribution box for fiber to the antenna (FTTA) systems.

BACKGROUND

As it is known, in modern cellular telephony cell the FTTA systems are used for connecting a baseband unit (BBU) typically installed at the base of a tower to one or more remote radio heads (RRH) typically installed at the top of the tower. The BBU is usually connected to a fiber optic communication network to transmit or receive data signals whereas the RRHs are configured for wireless transmit data signals to or receive data signals from a mobile terminal.

The FTTA systems use hybrid electric/fiber optic cables for transmitting electric power and data signals from the BBU to the top of the tower.

In this specification, the expression "hybrid electric/fiber optic cable" or "hybrid cable" indicate a cable comprising at least one electric conductor and at least one optical fiber.

In the top of the tower the electric power and data signals are distributed to and from one or more RRHs through distribution boxes.

Distribution boxes are generally installed at the top of the tower and are used for connecting the conductors and optical fibers of the hybrid cables coming from the BBU with one or more outlets to which the RHHs can be connected through other hybrid jumper cables or through separated electric power cables and fiber optic cables.

Several distribution boxes are currently known.

For example, WO 2015/119983 A1 describes a device for connecting a hybrid cable to one or more jumper cables which includes: an enclosure having two opposed end walls and two opposed side walls; a power connector mounted to a first end wall; a fiber optic connector mounted to the first end wall; and a plurality of mixed media connectors mounted to a first side wall.

The power connector is electrically connected to the plurality of mixed media connectors, and the fiber optic connector is optically connected to the plurality of mixed media connectors. The described device, hence, is provided with separate power and fiber optic connectors at the outside of the box, requiring the use of proprietary connectors.

U.S. Pat. No. 9,069,151 B2 describes a composite cable breakout assembly that includes an enclosure for receiving a composite cable having a fiber optic cable with at least one optical fiber and an electrical power cable with at least one electrical conductor. The enclosure has at least one port providing passage to the exterior of the enclosure. The at least one optical fiber is terminated by a fiber optic connector and the at least one electrical conductor is terminated by an electrical connector. Alternatively, the at least one optical fiber and the at least one electrical conductor may be terminated by a composite optical/electrical connector. The fiber optic cable and the electrical power cable route to the at least one port enabling connection external to the enclosure for extension of optical signal and electrical power to components external to the enclosure.

US2015/0309271 A1 describes a power and optical fiber interface system that includes a housing having an interior. A cable inlet is configured to receive a hybrid cable having an electrical conductor and an optical fiber. An insulation displacement connector (IDC) is situated in the interior of the housing configured to electrically terminate the conductor, and a cable outlet is configured to receive an output cable that is connectable to the IDC and configured to output signals received via the optical fiber.

In light of the above state of the art, the Applicant has faced the problem of providing a distribution box easy field installable, capable of withstanding to any environmental conditions and capable of providing for ease of future upgrades without the need to replace hybrid cables.

SUMMARY

A distribution box for Fiber To The Antenna (FTTA) systems comprises an upper compartment and a lower compartment separated one from one another, the lower compartment being provided with a sealable entry point for a pre-terminated hybrid cable comprising an electric conductor and an optical fiber, a plurality of electrical connectors for the electrical conductor of the pre-terminated hybrid cable and an optical connector for the optical fiber of the pre-terminated hybrid cable being arranged within the lower compartment, the upper compartment comprising one or more connection points for hybrid jumper cables.

BRIEF DESCRIPTION OF THE DRAWINGS

Further characteristics will be apparent from the detailed description given hereinafter with reference to the accompanying drawings, in which:

FIGS. 1A and 1B are two schematic perspective view of a first embodiment of a distribution box according to embodiments of the present disclosure with a pre-terminated hybrid cable and hybrid jumper cables connected;

FIGS. 2A and 2B are a side view and a perspective view respectively of the distribution box of FIGS. 1A-1C with just the pre-terminated hybrid cable connected;

FIG. 2C is a schematic perspective of the distribution box of FIGS. 2A and 2B coupled with the bracket of FIG. 1C;

DETAILED DESCRIPTION OF ILLUSTRATIVE EMBODIMENTS

Figure 1C:
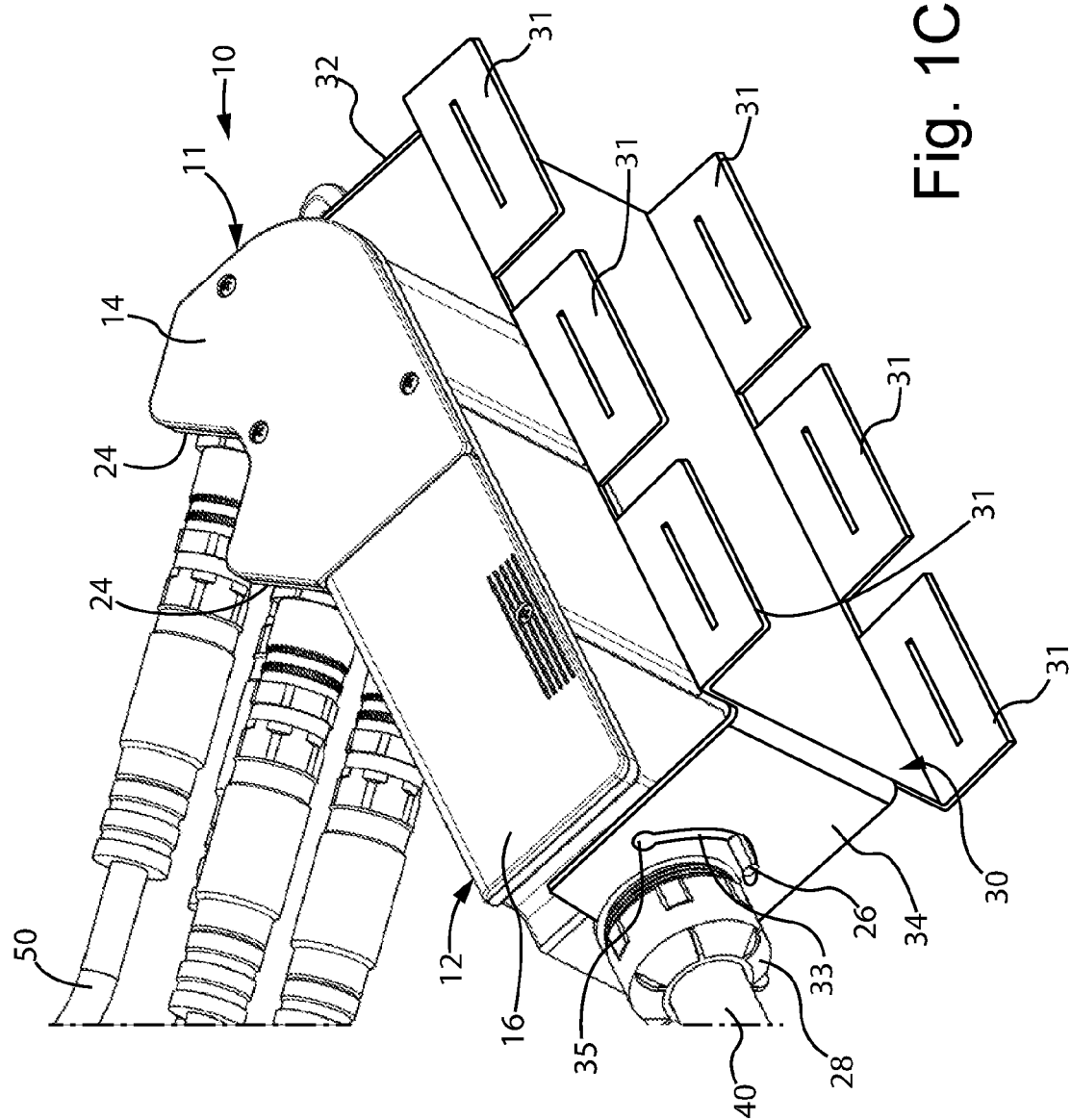
FIG. 1C is a schematic perspective of the distribution box of FIGS. 1A and 1B coupled with a bracket.
Figure 2A:
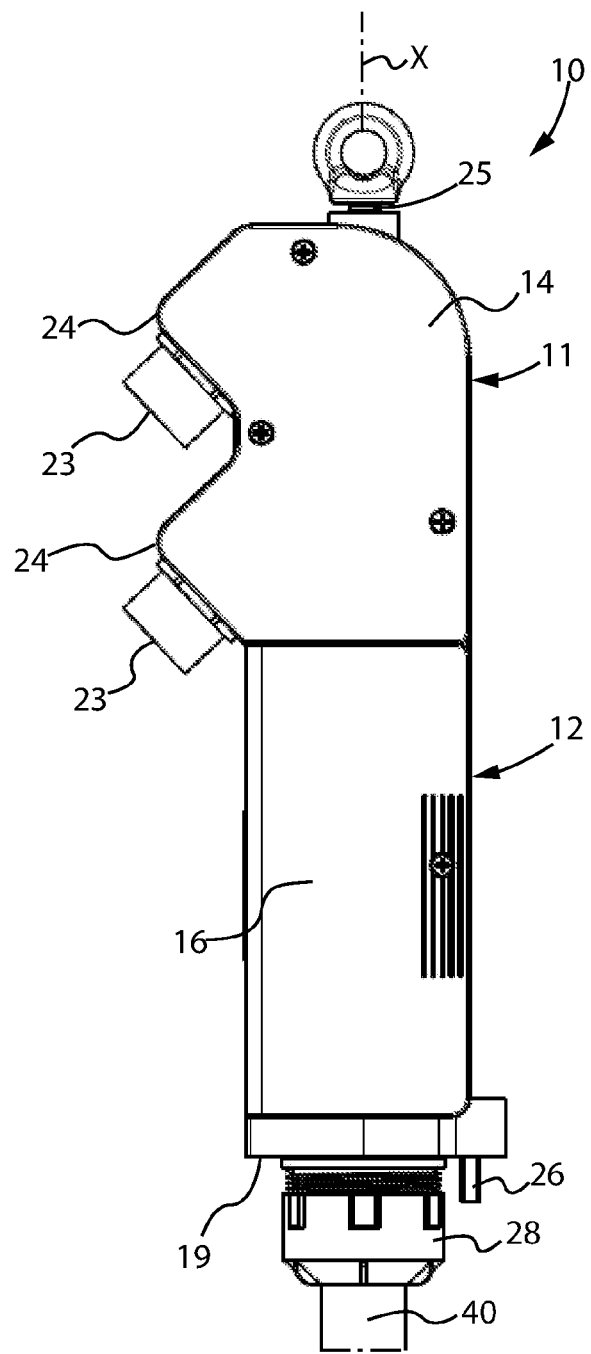
Figure 3A:
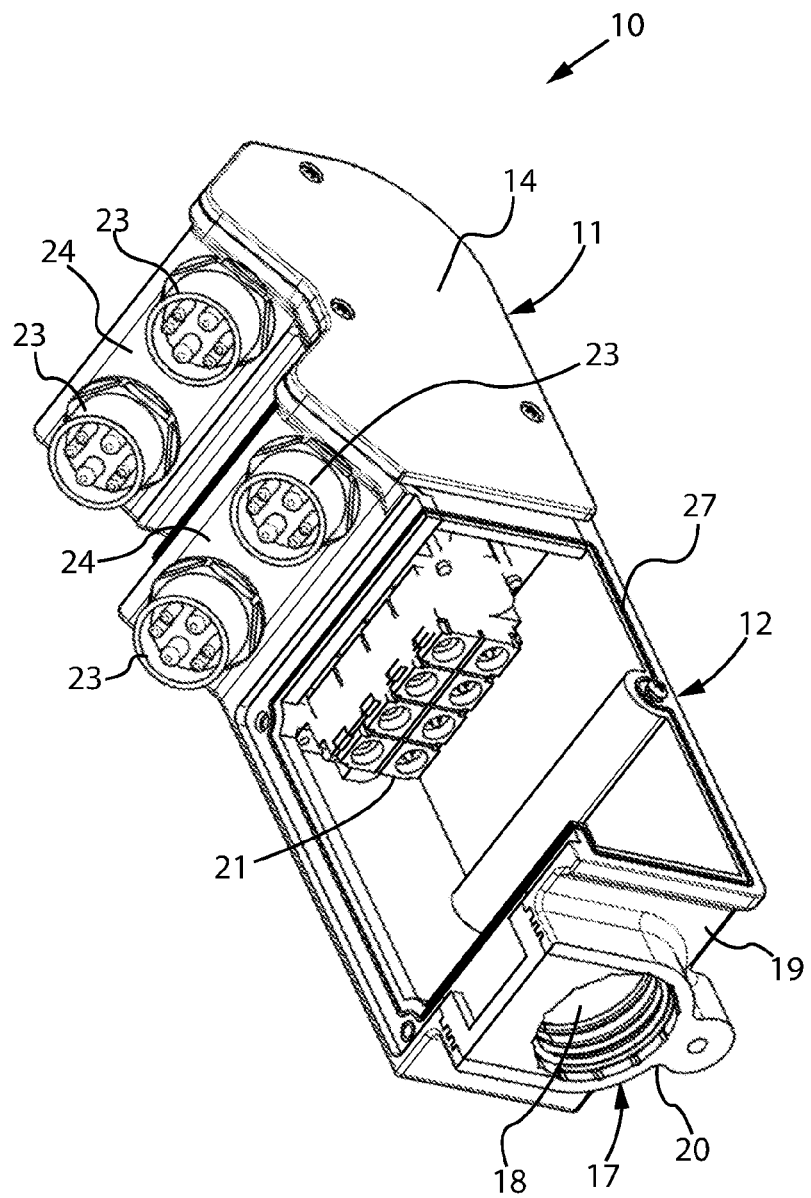
FIGS. 3A and 3B are two perspective view of the distribution box of FIGS. 1A-1C and 2A-2C with a lower compartment opened.
Figure 4A:
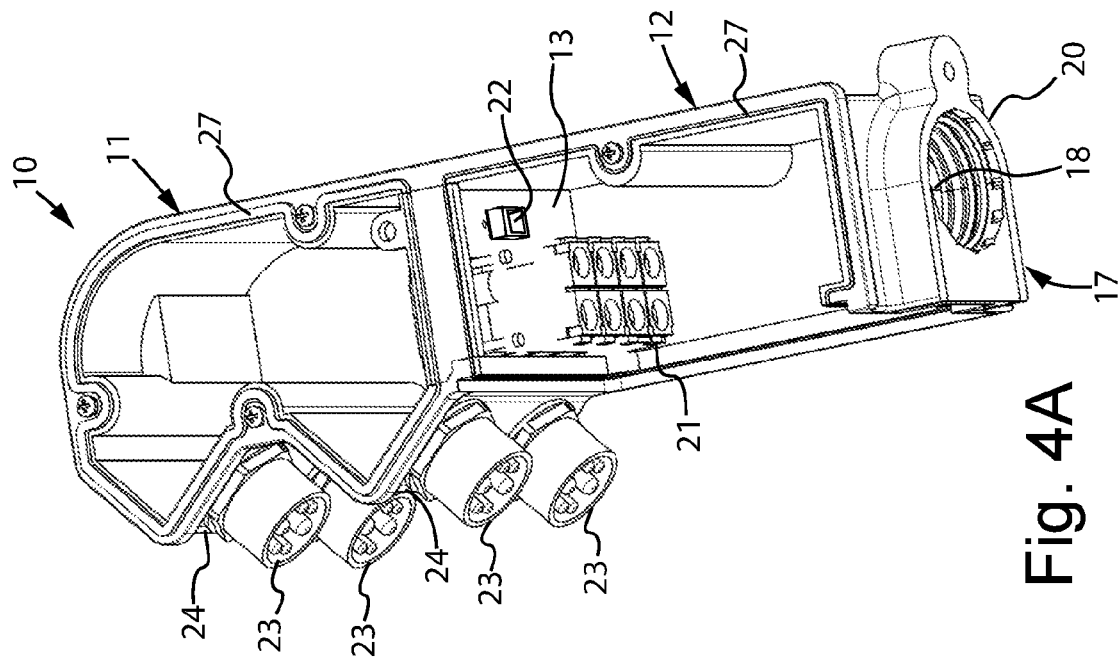
FIG. 4A is a perspective view of the distribution box of FIGS. 3A and 3B with the lower compartment opened and the upper compartment opened.
Figure 3B:
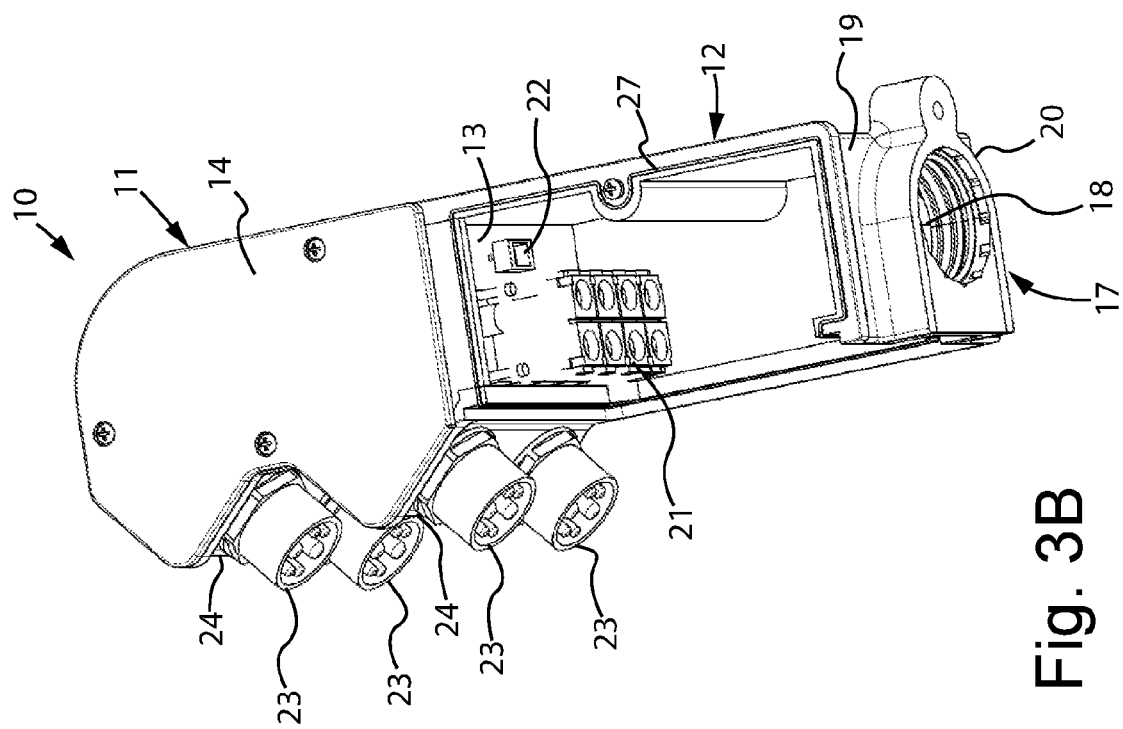
Figure 3C:
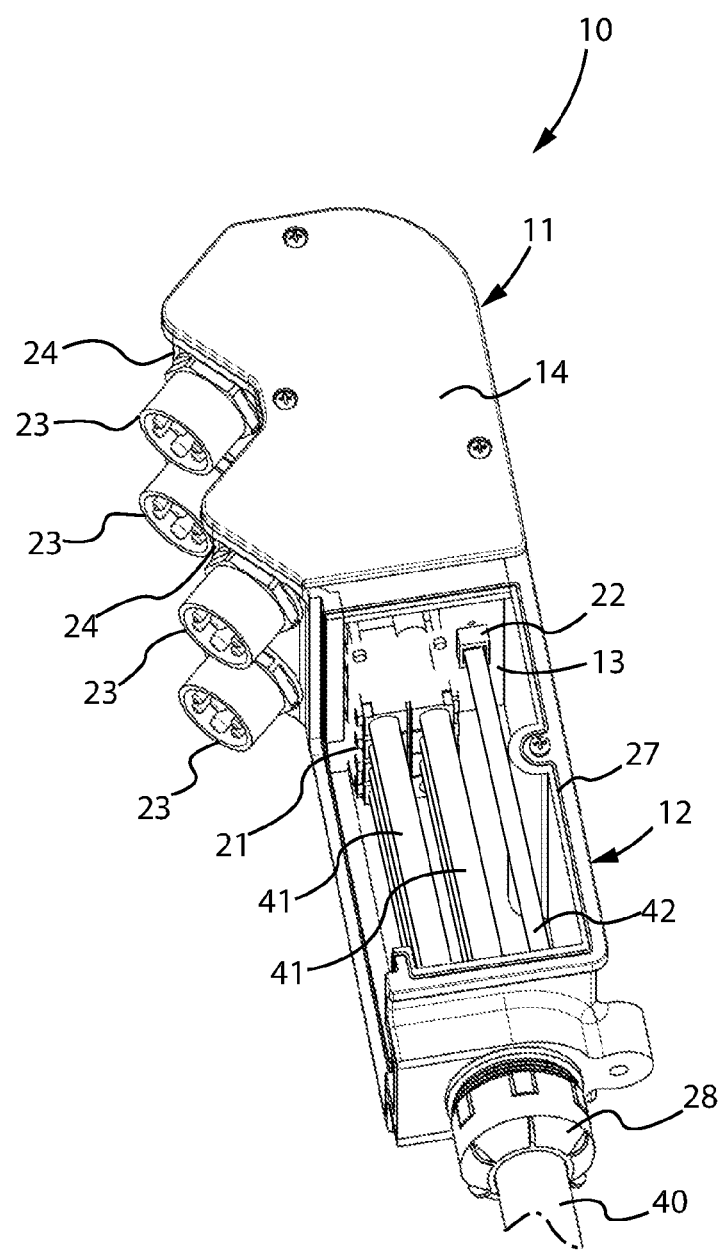
FIG. 3C is a perspective view of the distribution box of FIGS. 3A and 3B with the pre-terminated hybrid cable connected.
Figure 4B:
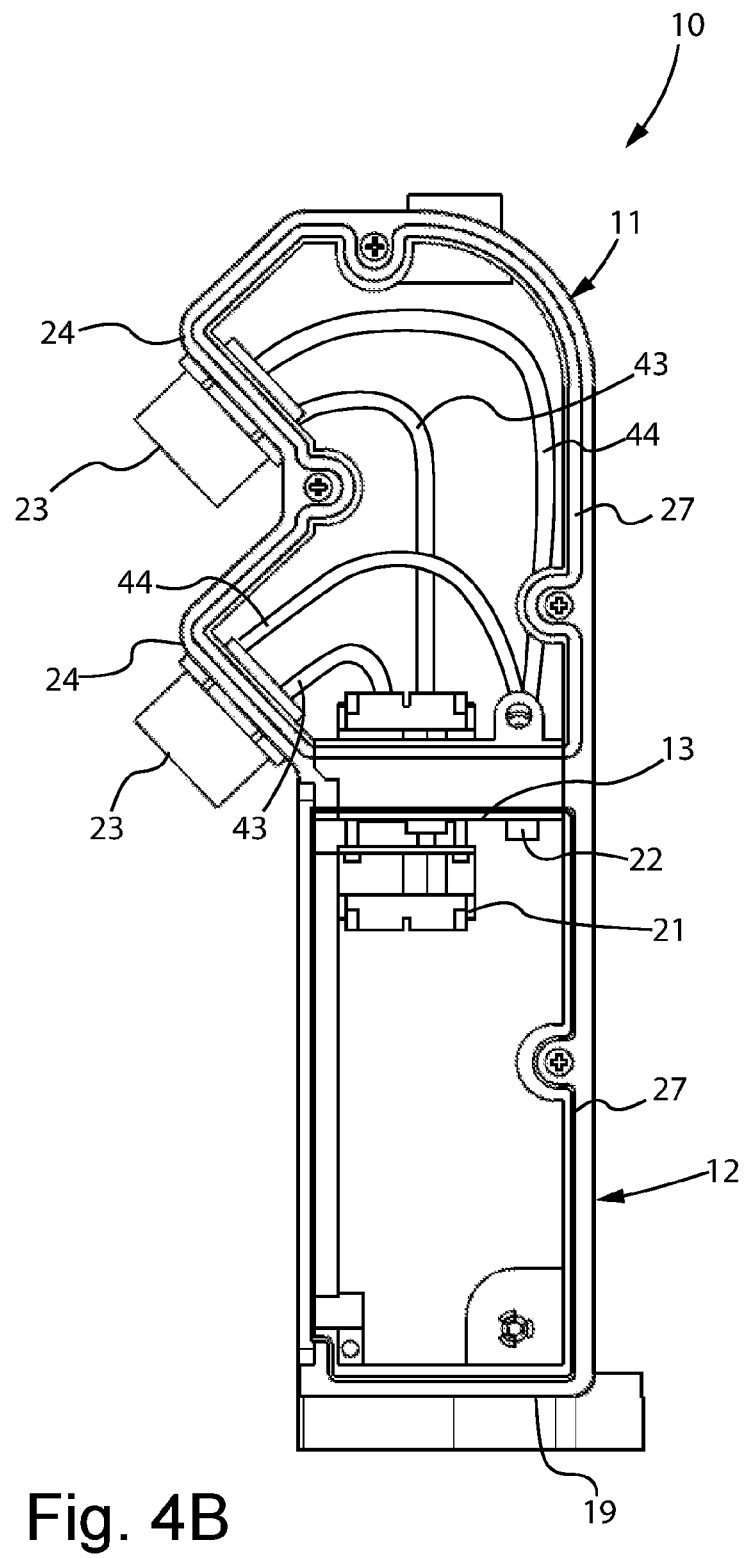
FIG. 4B is a side view of the distribution box of FIG. 4A with the connections configured in the upper compartment.
Figure 5A:
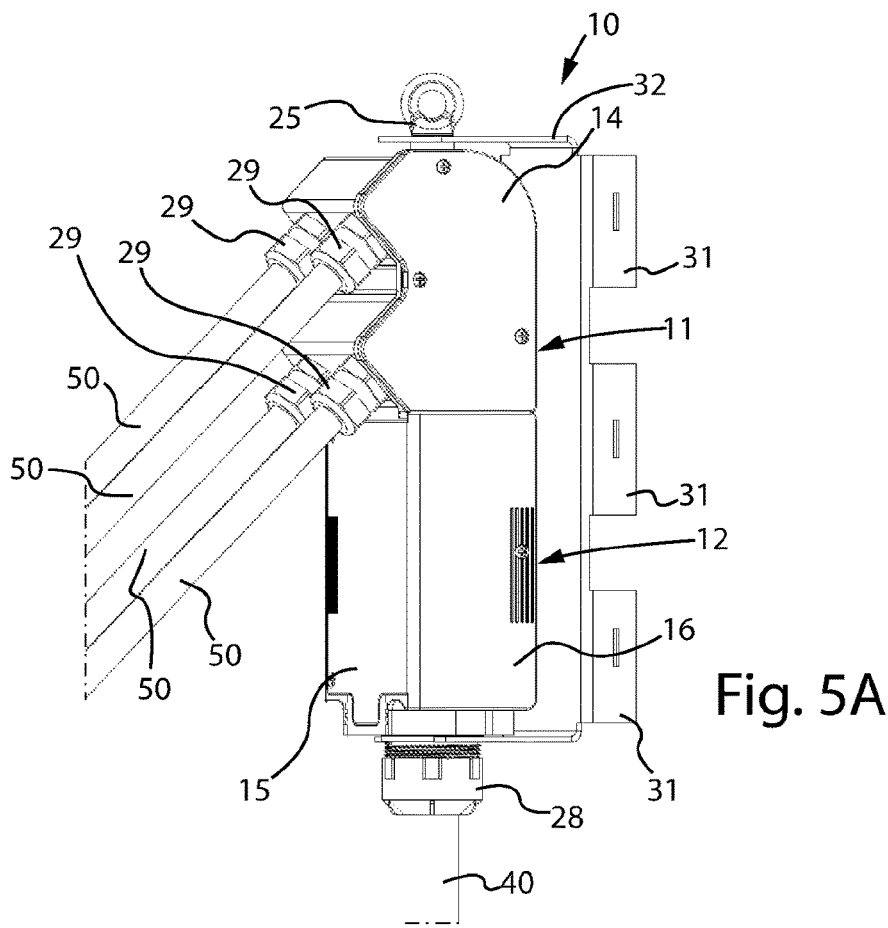
FIG. 5A is a schematic perspective view of a second embodiment of the distribution box according to embodiments of the present disclosure with a pre-terminated hybrid cable and hybrid jumper cables connected.
Figure 5B:
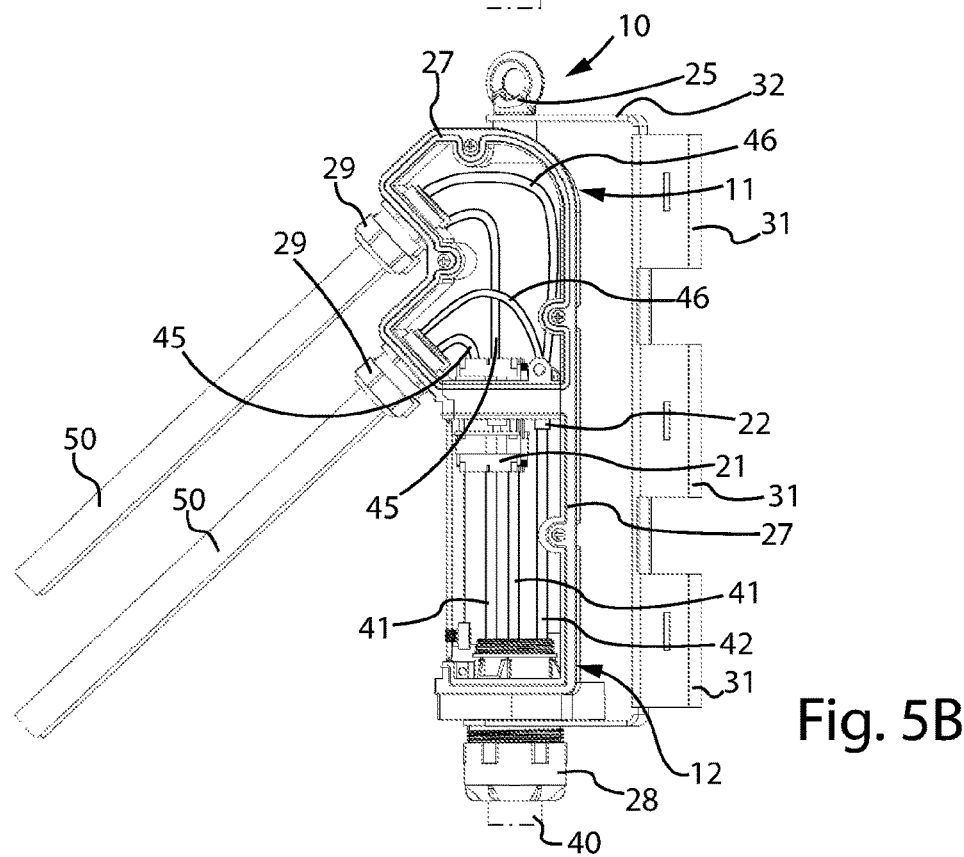
FIG. 5B is a side view of the distribution box of FIG. 5A with the lower compartment opened and the upper compartment opened.

In various embodiments, the present application overcomes these and other problems through a distribution box for FTTA systems comprising: an upper compartment and a lower compartment separated one from one another, the lower compartment being provided with a sealable entry point for a pre-terminated hybrid cable comprising at least one electric conductor and at least one optical fiber, a plurality of electrical connectors for electrical power conductors and at least one optical connector for optical fiber being arranged within the lower compartment, the upper compartment comprising one or more connection points for hybrid jumper cables.

Indeed, the distribution box for FTTA systems, according to embodiments of the disclosure, allows to easily manually connect the at least one electric conductor and the at least one optical fiber of the pre-terminated hybrid cable to respective connectors within the lower compartment, avoiding the use of proprietary hybrid connector for the hybrid cable.

Preferably, the connection points for hybrid jumper cables comprise hybrid connectors, electrical connections between the electrical connector and hybrid connectors and optical connections between the optical connector and hybrid connectors being provided within the upper compartment.

In this way, since the connections between the hybrid connectors and the electric connector and between the hybrid connectors and the optical connector are pre-configured in the upper compartment, once the at least one electric conductor and the at least one optical fiber of the pre-terminated hybrid cable are connected to respective connectors within the lower compartment, the pre-terminated hybrid cable results to be connected to the hybrid connectors without any further operation.

Alternatively, the connection points for hybrid jumper cables comprise cable glands and the distribution box further comprises electrical connections between the electrical connector and each hybrid jumper cable and optical connections between the optical connector and each hybrid jumper cable within the upper compartment.

In the alternative embodiment the upper compartment preferably comprises a plurality of electrical connectors and one or more optical connectors arranged within the upper compartment, as well as electrical connections between the electrical connectors in the lower compartment and electrical connectors in the upper compartment and optical connections between optical connectors in the lower compartment and optical connectors in the upper compartment are also provided within the box.

In this case, the distribution box for FTTA systems, according to embodiments of the disclosure, allows to easily manually connect the hybrid jumper cables, which are preferably pre-terminated, within the upper compartment avoiding the use of proprietary hybrid connectors for the hybrid jumper cables.

Preferably, the upper compartment and the lower compartment are made as a single body.

In this case, the distribution box can be easily produced through an injection-moulding process.

In a preferred embodiment of the present disclosure, each of the two compartments is closable by one or more closing removable panels.

In this way the connections made in the upper compartment and in the lower compartment are protected by the external environment condition.

Preferably, the connection points for hybrid jumper cables are provided on a side wall of the upper compartment facing downwards at a predetermined angle with respect to the bottom wall of the lower compartment.

In a more preferred embodiment, the portions of the side wall, where the connection points for hybrid jumper cables are provided, are oblique with respect to the bottom wall of the lower compartment so as to face downwards at said predetermined angle.

This characteristic improves the protection against the external environment condition since it renders more difficult the penetration of water or dust inside the connection points for hybrid jumper cables.

Preferably, the sealable entry point is obtained by an opening on the bottom wall of the lower compartment and an insert coupled in a removable manner to the bottom wall.

This renders easy the installation of the pre-terminated hybrid cable in the distribution box, since such a cable may be first accommodated inside the opening and then firmly coupled to the sealable entry point through the application of the insert to the bottom wall.

Moreover, the sealable entry point faces downwards and this assures high protection against water and dust.

Preferably, the distribution box comprises a first pin fixed in a removable and rotatable manner to the top of the upper compartment, the first pin having a pivoting axis (X) around which the distribution box can rotate, the first pin being further provided with an eye at the top, the distribution box being provided with rotation limiting elements for limiting the rotation of the distribution box around said pivoting axis (X).

In this way the rotation can compensate for any stresses which may occur on the hybrid cable avoiding possible damages to the hybrid cable.

Preferably, the distribution box can be coupled with a bracket mountable to a pole, the rotation limiting elements comprising a second pin that projects downwards with respect to the bottom wall, said second pin being shaped so as to be slideably engageable in an arc-shaped slot made on a portion of the bracket.

This avoids the hybrid jumper cables from beating against the bracket or the pole.

Preferably, the distribution box includes different hybrid connectors depending on the network type.

Therefore, the distribution box can be used in different configurations for different technologies, such as 4G or 5G type networks.

A distribution box 10 for FTTA systems according to embodiments of the present disclosure is shown in the enclosed figures.

The distribution box 10 for FTTA systems comprises an upper compartment 11 and a lower compartment 12 separated one from one another.

For the sake of clarity, it is specified that in the present description, the terms "upper", lower", "top", "bottom", "side" refers to the positions assumed by an element during the work condition, i.e. after the installation of the distribution box 10.

The two compartments 11, 12 are separated by a partition wall 13.

Preferably, the upper compartment 11 and the lower compartment 12 are made as a single body.

Preferably, the upper compartment 11 and the lower compartment 12 are made of an injection moulded Glass filled Polycarbonate body.

Each of the two compartments 11, 12 can be closed by one or more closing removable panels 14, 15, 16.

Preferably, appropriate sealing 27 is provided between the removable panels and the compartments, such as a rubber gasket.

The lower compartment 12 is provided with a sealable entry point 17 for a hybrid cable 40, in particular a pre-terminated hybrid cable 40 comprising at least one electric conductor 41 and at least one optical fiber 42.

Preferably, the sealable entry point 17 is obtained by an opening 18 on the bottom wall 19 of the lower compartment 12 and an insert 20 coupled in a removable manner to the bottom wall 19. The opening 18 and the insert 20 comprise one or more seats for sealing elements, such as one or more O-rings, on their internal surface.

According to embodiments of the present disclosure, a plurality of electrical connectors 21 for electrical power conductors and at least one optical connector 22 for optical fibers are arranged inside the lower compartment.

Preferably, the electrical connectors 21 and the at least one optical connector 22 are mounted on the partition wall 13 so that their rear parts face the interior of the upper compartment 12.

Preferably, the at least one optical connector 22 is a Multi-Fiber-Push-On connector.

The electrical connectors 21 can be of any known type.

In the pre-terminated hybrid cable 40 the at least one conductor 41 terminates with a first power connector adapted to be coupled in a respective electrical connector 21, and the at least one optical fiber 42 terminates with a first optical connector adapted to be coupled with the at least one optical connector 22.

The pre-terminated hybrid cable 40 is provided with a gland 28 adapted to couple with the sealable entry point 17. In particular, the gland 28 comprises flexible elements (not illustrated) that snap engage with the bottom wall 19. When the sealable entry point 17 is provided with O-rings, such sealing elements are compressed between the internal surface of the sealable entry point and the external surface of the gland 28.

Moreover, the gland 28 is fixed to the pre-terminated hybrid cable 40 so as to be integral with it.

According to embodiments of the present disclosure, the upper compartment 11 comprises one or more connection points 23 for hybrid jumper cables.

Preferably, the connection points 23 for hybrid jumper cables comprise hybrid connectors 23.

In this way one or more hybrid jumper cables 50 can be connected to the hybrid connectors 23.

In this case, advantageously, electrical connections 43 between the electrical connector 21 and hybrid connectors and optical connections 44 between the optical connector 22 and hybrid connectors are provided within the upper compartment.

These electrical and optical connections are made through electric conductors 43 and optical fibers 44 respectively.

Advantageously, the upper compartment 11 can include different hybrid connectors 23 depending on the network type.

For example, the upper compartment 11 can present 4G type network hybrid connectors and/or 5G type network hybrid connectors. The 4G type network hybrid connectors are preferably four.

The 5G type network hybrid connectors are preferably one or two. In this case the electrical and optical connections provided in the upper compartment 11 change to direct all power and necessary optical fiber to the 5G type network hybrid connectors instead of the 4G type network hybrid connectors.

For example, the 4G type network hybrid connectors needs to receive a power of about 500 W, whereas the 5G type network hybrid connectors needs to receive a power of about 2000 W.

According to an alternative embodiment of the present disclosure, the connection points 23 for hybrid jumper cables comprise cable glands 29 and the distribution box further comprises electrical connections 45 between the electrical connector 21 and each hybrid jumper cable and optical connections 46 between the optical connector 22 and each hybrid jumper cable within the upper compartment 11.

In this alternative embodiment, in particular, the upper compartment 11 preferably comprises a plurality of electrical connectors and one or more optical connectors arranged within the upper compartment 11; in this case, the electrical connectors in the upper compartment 11 are connected to the electrical connectors 21 in the lower compartment 12 through electrical connections, and the one or more optical connectors in the upper compartment 11 are connected to the optical connectors 22 in the lower compartment 12 through optical connections.

Preferably, the connection points 23 for hybrid jumper cables are provided on a side wall 24 of the upper compartment 12 so as to face downwards at a predetermined angle, for example 45°, with respect to the bottom wall 19 of the lower compartment.

More preferably, the portions of the side wall 24 where the connection points 23 for hybrid jumper cables are provided are oblique with respect to the bottom wall 19 so as to face downwards at said predetermined angle, as it can be observed in the enclosed figures.

Advantageously, the distribution box 10 comprises a first pin 25 fixed in a removable and rotatable manner to the top of the upper compartment 11. The first pin 25, in particular, has a pivoting axis X around which the distribution box 10 can rotate.

Preferably, the first pin 25 is provided with an eye at the top through which it is possible to hang the distribution box 10 for lifting or lowering such a distribution box 10.

Preferably, the distribution box 10 is provided with rotation limiting elements 26 for limiting the rotation of the distribution box 10 around the pivoting axis X within a predetermined angle range.

The distribution box 10 can, advantageously, be coupled with a bracket 30 mountable to a pole.

The bracket 30 can comprise anchor plates 31 for being coupled to a pole.

In the particular illustrated embodiment, the bracket 30 comprises a first portion 32 coupled to the top of the upper compartment 11 through the first pin 25. In this way the distribution box 10 can rotate with respect to the bracket 30 around the pivoting axis X.

In this case, the rotation limiting elements 26 comprises a second pin 26 that projects downward with respect to the bottom wall 19.

The second pin 26 is shaped so as to be slidable engageable in an arc-shaped slot 33 made on a second portion 34 of the bracket 30. In this way, the rotation of the distribution box 10 is guided by the sliding of the second pin 26 in the arc-shaped slot 33 and it is limited by the angular range described by the arc-shaped slot 33.

In the particular illustrated embodiment, the arc-shaped slot 33 presents two opposite end rounded portions 35 and a central rounded portion having a diameter larger than the width of the arc-shaped portion of the slot 33. In this case, the second pin 26 presents a substantially rectangular cross-section wherein the short opposite sides are curved. The second pin 26, then, is dimensioned so that it can slide in the arc-shaped slot 33 when the two opposite long sides of the substantially rectangular cross-section are parallel to the direction of the arc-shaped slot 33 and will lock in the end rounded portions and in the central rounded portion where it can rotate of about 90°.

The invention claimed is:

1. A distribution box for Fiber To The Antenna (FTTA) systems comprising:
    an upper compartment and a lower compartment separated one from one another,
    the lower compartment being provided with a sealable entry point for a pre-terminated hybrid cable comprising an electric conductor and an optical fiber, a plurality of electrical connectors for the electrical conductor of the pre-terminated hybrid cable and an optical connector for the optical fiber of the pre-terminated hybrid cable being arranged within the lower compartment,
    the upper compartment comprising one or more connection points for hybrid jumper cables; and
    a first pin fixed in a removable and rotatable manner to the top of the upper compartment, the first pin having a pivoting axis around which the distribution box can rotate.

2. The distribution box for Fiber To The Antenna (FTTA) systems according to claim 1, wherein the connection points for hybrid jumper cables comprise hybrid connectors, electrical connections between the electrical connector and hybrid connectors and optical connections between the optical connector being provided within the upper compartment.

3. The distribution box for Fiber To The Antenna (FTTA) systems according to claim 1, wherein the connection points for hybrid jumper cables comprise cable glands and wherein the distribution box further comprises electrical connections between the electrical connector and each hybrid jumper cable and optical connections between the optical connector and each hybrid jumper cable within the upper compartment.

4. The distribution box for Fiber To The Antenna (FTTA) systems according to claim 1, wherein the upper compartment and the lower compartment are made as a single body.

5. The distribution box for Fiber To The Antenna (FTTA) systems according to claim 1, wherein each of the lower and upper compartments is closable by one or more closing removable panels.

6. The distribution box for Fiber To The Antenna (FTTA) systems according to claim 1, wherein the connection points for hybrid jumper cables are provided on a side wall of the upper compartment facing downwards at a predetermined angle with respect to the bottom wall of the lower compartment.

7. The distribution box for Fiber To The Antenna (FTTA) systems according to claim 6, wherein the portions of the side wall, where the connection points for hybrid jumper cables are provided, are oblique with respect to the bottom wall of the lower compartment the predetermined angle.

8. The distribution box for Fiber To The Antenna (FTTA) systems according to claim 1, wherein the sealable entry point is obtained by an opening on the bottom wall of the lower compartment and an insert coupled in a removable manner to the bottom wall.

9. The distribution box for Fiber To The Antenna (FTTA) systems according to claim 8, the first pin being provided with an eye at the top, the distribution box being provided with rotation limiting elements for limiting the rotation of the distribution box around the pivoting axis.

10. The distribution box for Fiber To The Antenna (FTTA) systems according to claim 9, wherein the distribution box is provided with a bracket mountable to a pole, the rotation limiting elements comprising a second pin that projects downwards with respect to the bottom wall, the second pin being shaped so as to be engageable by sliding in an arc-shaped slot made on a portion of the bracket.

11. The distribution box for Fiber To The Antenna (FTTA) systems according to claim 1, wherein the distribution box comprises first hybrid connectors for a first network type and second hybrid connectors for a second network type, the first network type being different from the second network type, the first hybrid connectors being different from the second hybrid connectors.

12. A distribution assembly comprising:
    a distribution box that comprises an upper compartment and a lower compartment separated one from one another, wherein the lower compartment comprises
        a sealable entry point for a pre-terminated hybrid cable comprising electric conductors and an optical fiber,
        a plurality of electrical connectors for the electrical conductors of the pre-terminated hybrid cable, and
        an optical connector for the optical fiber of the pre-terminated hybrid cable being arranged within the lower compartment,
    wherein the upper compartment comprises one or more connection points for hybrid jumper cables; and
    a first pin fixed in a removable and rotatable manner to the top of the upper compartment, the first pin having a pivoting axis around which the distribution box can rotate.

13. The distribution assembly according to claim 12, further comprising one or more hybrid jumper cables attached to the upper compartment.

14. The distribution assembly according to claim 12, further comprising one or more hybrid jumper cables entering the upper compartment of the distribution box.

15. The distribution assembly according to claim 12, wherein the connection points for hybrid jumper cables are provided on a side wall of the upper compartment facing downwards at a predetermined angle with respect to the bottom wall of the lower compartment, wherein the portions of the side wall, where the connection points for hybrid jumper cables are provided, are oblique with respect to the bottom wall of the lower compartment.

16. The distribution assembly according to claim 12, wherein the sealable entry point is obtained by an opening on the bottom wall of the lower compartment and an insert coupled in a removable manner to the bottom wall.

17. The distribution assembly according to claim 16, the first pin being provided with an eye at the top, the distribution box being provided with rotation limiting elements for limiting the rotation of the distribution box around the pivoting axis.

18. The distribution assembly according to claim 17, wherein the distribution box is provided with a bracket mountable to a pole, the rotation limiting elements comprising a second pin that projects downwards with respect to the bottom wall, the second pin being shaped so as to be engageable by sliding in an arc-shaped slot made on a portion of the bracket.

19. The distribution assembly according to claim 12, wherein the distribution box comprises first hybrid connectors for a first network type and second hybrid connectors for a second network type, the first network type being different from the second network type and the first hybrid connectors being different from the first hybrid connectors.

20. A communication system comprising:
- a communication tower;
- a baseband unit coupled to a fiber optic communication network and installed at a base of the communication tower;
- a remote radio head installed at a top of the communication tower;
- a distribution box attached to the communication tower;
- a pre-terminated hybrid cable comprising an electric conductor and an optical fiber, the pre-terminated hybrid cable connecting the baseband unit with the distribution box; and
- a hybrid jumper cable connecting the distribution box with the remote radio head, wherein the distribution box comprises an upper compartment and a lower compartment separated one from one another, wherein the lower compartment comprises
  - a sealable entry point for the pre-terminated hybrid cable,
  - a plurality of electrical connectors for the electrical conductor of the pre-terminated hybrid cable, and
  - an optical connector for the optical fiber of the pre-terminated hybrid cable being arranged within the lower compartment,
- wherein the upper compartment comprises one or more connection points for the hybrid jumper cable; and
- a first pin fixed in a removable and rotatable manner to the top of the upper compartment, the first pin having a pivoting axis around which the distribution box can rotate.

* * * * *